United States Patent [19]

Ferenc

[11] Patent Number: 4,592,044
[45] Date of Patent: May 27, 1986

[54] APPARATUS AND METHOD FOR CHECKING TIME SLOT INTEGRITY OF A SWITCHING SYSTEM

[75] Inventor: James J. Ferenc, Boulder, Colo.

[73] Assignee: AT&T Information Systems Inc., Middletown, N.J.

[21] Appl. No.: 613,049

[22] Filed: May 22, 1984

[51] Int. Cl.$^4$ .......................... H04J 1/16; H04J 3/14; H04B 3/46; G06F 7/34

[52] U.S. Cl. ...................................... 370/13; 375/10; 371/68

[58] Field of Search ............... 370/13, 15, 17; 375/10; 371/68

[56] References Cited

U.S. PATENT DOCUMENTS

| | | | |
|---|---|---|---|
| 3,895,349 | 7/1975 | Robson | 340/146.1 AL |
| 3,914,740 | 10/1975 | Han | 340/146.1 E |
| 3,944,800 | 3/1976 | Beck et al. | 371/68 |
| 3,982,111 | 9/1976 | Lerner et al. | 371/68 |
| 4,093,940 | 6/1978 | Maniere | 340/146.1 E |
| 4,143,354 | 3/1979 | Stoddart | 340/146.1 E |
| 4,528,661 | 7/1985 | Bahr et al. | 370/94 |

Primary Examiner—Douglas W. Olms
Assistant Examiner—Frank M. Scutch, III
Attorney, Agent, or Firm—John A. Caccuro

[57] ABSTRACT

Apparatus and method are disclosed for checking the time slot data word integrity of data communications in a time multiplexed communication system. A predetermined control bit of each data word of a data frame is alternately switched from its normal control bit function to a bit of a pseudo random sequence (PRS) for time slot data word integrity checking. During alternate data frames a checking circuit compares the predetermined bit of received consecutive data words against consecutive bits of a reference PRS and outputs a time slot cross connect error signal when a difference occurs.

14 Claims, 8 Drawing Figures

APPARATUS AND METHOD FOR CHECKING TIME SLOT INTEGRITY OF A SWITCHING SYSTEM

FIELD OF THE INVENTION

This invention relates to communication systems and, more particularly, to a method and apparatus for checking the time slot integrity of data paths of a time division switching system.

BACKGROUND OF THE INVENTION

In time multiplexed telephone switching systems, it is necessary to constantly monitor the time slot integrity of data as it travels through the system to detect any cross connections between the time slots. These cross connections can occur from addressing faults when accessing data buffers (data buffer memory locations correspond to specific time slots in the data stream), which interface the port modules to the time multiplex switch (TMS). It is desirable to detect these time slot cross connect situations as soon as they occur, to allow the system to disconnect the faulty data path with a minimum of data errors.

One known system inserts successive bits of a pseudo-random binary sequence (PRS) into a dedicated bit position of successive time slots of data, prior to the data being stored into a data buffer. When the data from each time slot is retrieved, the contents of the dedicated bit position is compared against the expected binary value of the corresponding bit of the PRS. While this technique is fast, it requires dedicating one bit of each transmitted data word to provide the time slot integrity checking capability.

SUMMARY OF THE INVENTION

The apparatus and method of the present invention derives the benefit of utilizing a PRS for checking time slot integrity of data words of a data frame without dedicating a data bit position for each time slot of each data frame. According to the present invention, the contents of a predetermined control bit position of each data word previously dedicated to providing a control function is assigned after every N data frames (N greater than or equal to 1) as a time slot integrity bit for each data word. The contents of the predetermined bit position along with other data is written into a data buffer, and when read therefrom is checked on appropriate data frames against either the expected control bit status or the expected bit of the PRS. An error signal is generated on the appropriate data frames, when the predetermined bit does not equal the expected bit of the PRS indicating that a time slot cross connect has occurred. In one embodiment, the circuit which generates the PRS signal is colocated with the comparing circuit and a remotely located loop-back circuit arrangement is provided to enable the testing of a remotely located data buffer.

BRIEF DESCRIPTION OF THE DRAWING

The operation of the present invention will be more fully appreciated from the detailed description which references the drawings in which.

DETAILED DESCRIPTION

Figure 1:
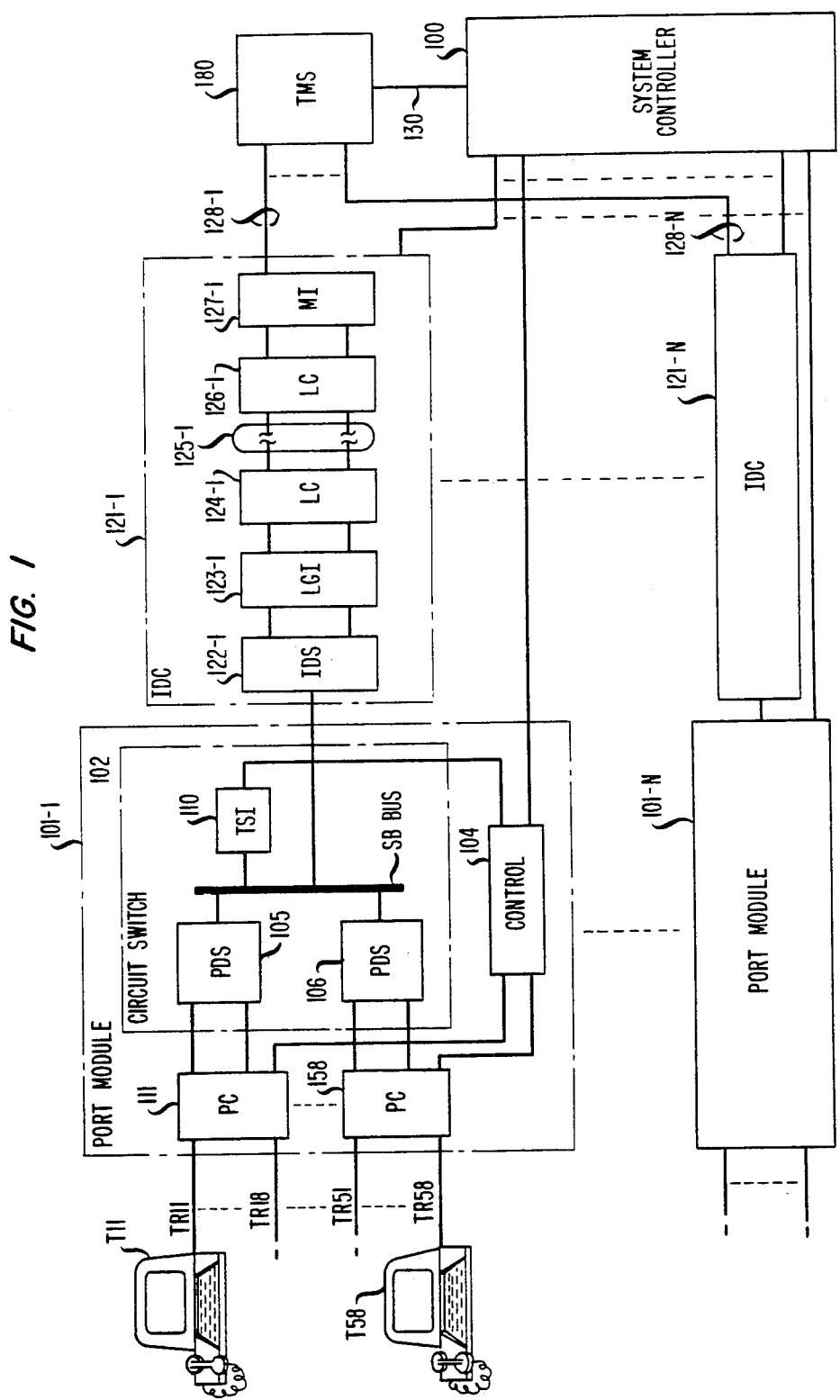
FIG. 1 shows a block diagram of a time multiplexed communication system incorporating the present invention.

An illustrative telephone switching system for incorporating the present invention is illustrated in FIG. 1. The system includes a system controller 100 and a plurality of port modules 101-1 through 101-N. Each port module includes a plurality of terminal equipment T11-T58 each of which is associated via communication paths TR11-TR58 with a respective one of port circuits (PC) 111-158. This terminal equipment may include telephone station sets as well as digital terminal devices. A circuit switch 102, which comprises a time slot interchange circuit 110 of the type illustrated in U.S. Pat. No. 4,112,258, may be used together with port data stores (PDS) 105 and 106 to interconnect a plurality of port circuits 111-158 and their associated data terminals and/or telephone station sets (T11-T58). Circuit switch 102 establishes communications connections among port circuits 111-158 using time slot interchanger (TSI) 110.

In this system, a control module 104 including port processor, I/O interface, and memory (not shown) interfaces the port circuits 111-158, circuit switch 102 and system processor 100. Control module 104 also performs many of the hardware-oriented and real-time intensive control tasks such as port scanning and other port supervision functions. This control module 104 thereby deloads system controller 100 and also functions to insulate system controller 100 from the hardware details of the terminal/station circuits served by the system.

The system of FIG. 1 also includes a time multiplexed switch (TMS) 180 which is connected to modules 101-1 through 101-N by intermodule data circuits 121-1 through 121-N, respectively. The TMS 180 is used in the serving of intermodule calls and is controlled in its operation by system controller 100 via path 130. The TMS is connected by intermodule data circuits 120-1 through 120-N to the SB bus associated with the TSI in each module. The TMS functions on intermodule calls by effectively interconnecting the SB bus in the two modules involved on a call with each other so that time division multiplexed-PCM data can be exchanged between modules.

While the operation of the present invention will be described in terms of the system shown in FIG. 1, it should be borne in mind that the present invention can be used in any number of similar type systems. Hence, only system information and control signals relevant to the understanding of the present invention will be included in this detailed description. Moreover, since the system of FIG. 1 is implemented as a stored program controlled system the present invention must be interfaced to the overall program structure of the system.

Thus, in describing the present invention only those interactions with the various system components, control signals or program structures which are required for an understanding of the present invention will be included in the description that follows.

During intramodule calls between terminals (e.g., T11 and T58) of the same port module (i.e., 101-1) data is not transmitted to intermodule data circuit (IDC) 121-1 and TMS 180. However, an intermodule call between a terminal of port module 101-1 and 101-N traverses IDC 121-1, TMS 180 and IDC 121-N. The intermodule call is more susceptible to cross connects because of the additional memory buffering provided in the IDC units. Consequently, there is a higher probability of cross connections on intermodule calls. The most likely cause of a cross connect of time slots arises from addressing faults in reading or writing into the various buffers 201, 202 and 203 of the IDC units. The present invention is directed to checking the time slot integrity of data transfers handled by the IDC units.

Each IDC also buffers the data from its associated port module and synchronizes data transfer operations to that of TMS 180. Thus, delays caused by circuitry or optical cable length (i.e., 125-1) are compensated. Each IDC (e.g., 121-1) is identical and includes an intermodule data store (IDS, 122-1), a light guide interface (LGI, 123-1), a pair of fiber optic data link circuits (LC, 124-1 and 125-1) for communication over an optical cable, 127-1, and a module interface (MI, 126-1).

Figure 2:
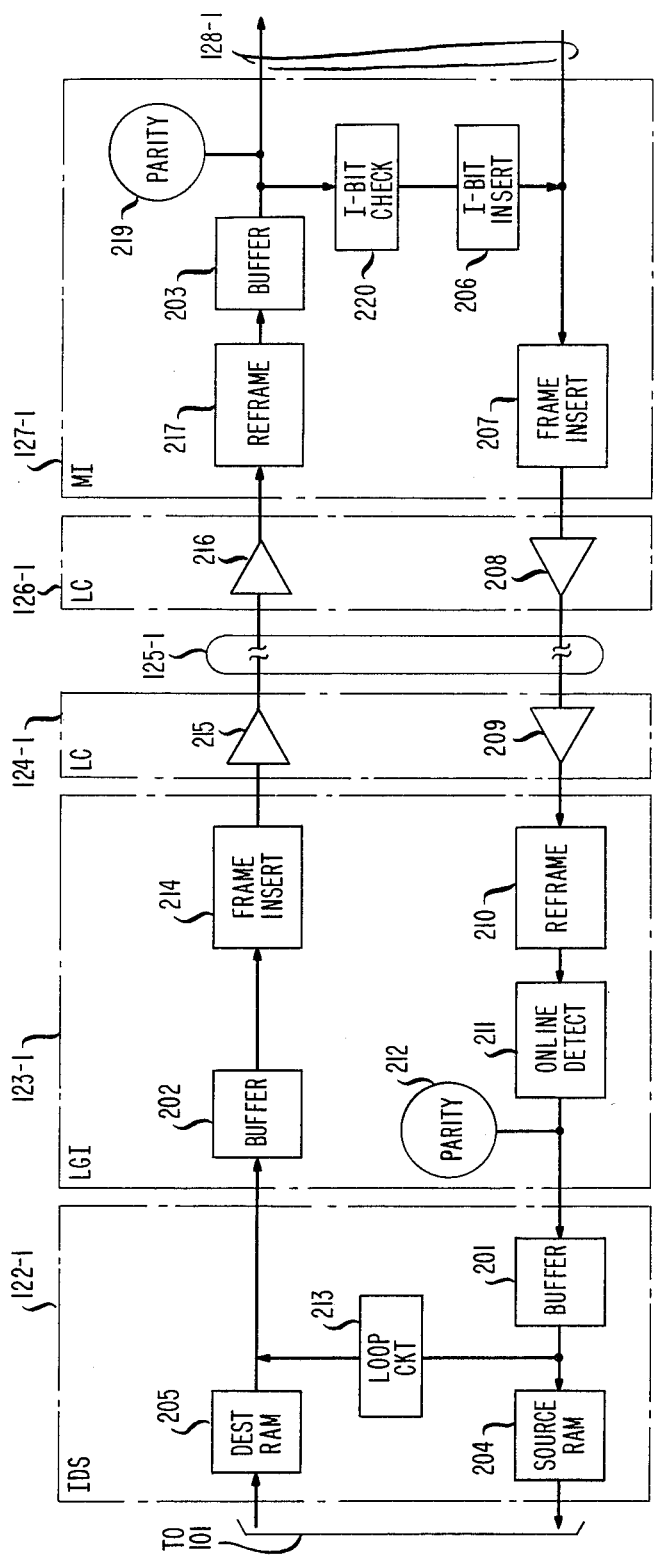
FIG. 2 shows a block diagram of the various circuits of the intermodule data circuit shown in FIG. 1.

FIG. 2 shows the intermodule data circuit (IDC) in more detail. The IDS, LCI and MI circuits each have a random access memory (RAM) data buffer (201, 202, 203) requiring time slot integrity checking. Excluding the source (204) and destination (205) RAMs of the IDS, the three data buffers (201, 202, 203) in the intermodule data circuit are of identical design; failure definition and detection are likewise identical for all three buffers. There are three general sources of addressing faults in these RAM data buffers: failures in the read address generators or bus drivers, failures in the write address generators or bus drivers, and failures in the RAM internal addressing circuitry. These well known memory addressing circuits are not shown in FIG. 2. Assuming only single addressing failures, the present detection method for each source is discernible.

Figure 3:
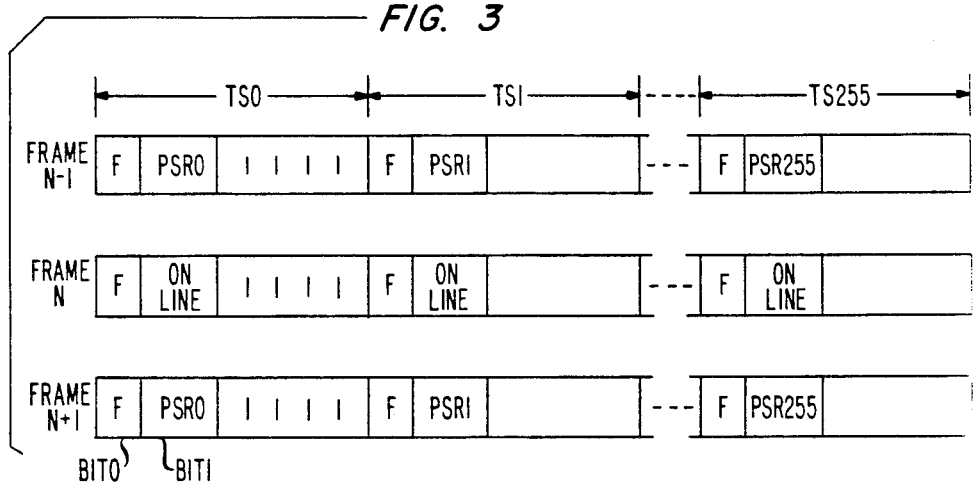
FIG. 3 shows the data word format for an intermodule data call.

According to the present invention, after every N data frames a control bit of each data word of the data frame is replaced with a bit of a known binary sequence, providing a method for detecting addressing faults and cross connects in data buffers. In the disclosed embodiment, N is equal to 1 so that on alternate data frames a well known pseudo-random sequence (hereinafter PRS), is inserted bit by bit into a predetermined control bit position of the data words of sequential time slots of the data frame. FIG. 3 illustrates the data word format for intermodule data transmission and includes a frame bit, a predetermined bit, and other control, data, and parity bits. The predetermined bit (or integrity bit) position, bit 1, of each time slot data word TS0 through TS255 contains on alternate data frames, respectively, either the integrity check bits PSR0 through PSR255 of the PRS or the "on-line" control bit.

With joint reference to FIGS. 2 and 3, and according to the present invention, cross connections are detected as follows. A PRS 256 bits long is sequentially inserted by integrity bit transmitting circuit 206 in the predetermined integrity bit position, bit 1, of each time slot. Integrity bit check circuit 220 compares the sequence received from the integrity bit position of sequential time slot data words against the PRS signal which was sent by circuit 206. Note, the PRS signal in circuits 206 and 220 can be derived from separate sources so long as a bit synchronism was maintained therebetween. If the received sequence is equal to the PRS sequence no addressing errors have occurred and no cross connect of time slots has occurred. Since the integrity bit transmit circuit 206 and check circuit 220 are colocated at the TMS end and the signals are synchronous, the detection process is simplified at check circuit 220. Integrity bit transmit circuit 206 and check circuit 220 will remain synchronous for any delay around the IDC circuit equal to an integral number of frames. The integrity bit transmit circuit 206 and check circuit 220 need not be colocated so long as each has means for generating the PRS.

If an error is detected, the system controller is signaled and calls an appropriate program which detects in which data buffer and/or time slots the error is occurring. Since the PRS signal traverses all the buffers of FIG. 2 it is thus checking all of the buffers at the same time. Hence, an error in any of the three buffers would be detected. Moreover, because the PRS is a unique predetermined sequence the check circuit 220 can use the same algorithm used by circuit 206 to generate the PRS and determine numerically what time slot is next expected. Thus, beside detecting errors in the integrity bit position, check circuit 220 in one embodiment could be made to determine the time slots in which the errors are occurring. Knowing the time slots in which the integrity bits are in error, the check circuit 220 can send that information to the system controller. The system controller then isolates the problem and takes corrective action to eliminate or switch around the problem circuit.

By way of example, assume the most significant addressing bit of a write addressing circuit for one buffer was inoperative or stuck at a logic 0 state. Thus, all write operations to the upper half of that buffer would actually be written into the lower half of the buffer. Note, however, that such a condition may not necessarily cause a time slot cross connect error. For example, if a read to the lower half of the buffer occurs before the erroneous attempted write to the upper half of the buffer occurs, then the information in the lower half of the buffer is still valid data while the data in the upper half of the buffer remains at its previous frame value since the write circuits can no longer write to the upper half of the buffer. However, because the integrity bit is alternated every frame between a bit of the PRS and an on-line control bit, the check circuit 220 immediately detects either a steady state on-line bit or steady state PRS bit in the integrity bit position for all time slots in the upper half of the buffer.

When a read to the lower half of the buffer occurs after an erroneous attempted write to the upper half of the buffer has occurred, a time slot cross connect error occurs since data which should be in the upper half of the buffer is written into the lower half of the buffer. The check circuit 220 detects this error because the PRS is not what is expected. It should be noted that these detected errors would not have been detected by the parity error circuit, since parity only checks that the data is correct and not whether the data is in the correct time slot.

As shown in FIG. 3, during frames N−1 and N+1 the integrity check bits of the PRS are inserted in bit 1 location. However, during frame n a control bit having a constant logic level, the on-line bit in one embodiment, is inserted in the integrity bit 1 location of each time slot.

The following sentences provide a brief description of the use of the on-line bit by the system shown in FIG. 1. Since certain embodiments of the system shown in FIG. 1 may include more than one TMS, 180, the on-line bit indicates to the port modules whether a particular TMS is on-line. Hence, the port modules know that they should listen to that TMS. In the present embodiment the parity circuits do not include this reserved bit position. To provide TMS on-line status to the LGI, the value of TMS on-line status is latched each frame and inserted as the DC check signal during alternating frames. Thus bit 1 contains the PRS check signal for one frame, then TMS on-line status for one frame (as the DC check signal), followed by the PRS check signal for the next frame, and so forth.

The utilization of the PRS integrity check bits to detect the above-identified addressing faults is described in the following paragraphs. Failures in the read addressing circuits cause correctly written time slots to be read out in the wrong order from all or part of the RAM buffer locations (201, 202, and 203). By mapping the data of a time slot to its time slot number, this fault can be detected. Such a mapping is already done with the framing signal appearing in the bit 0 location of each time slot. Inserting one bit of the PRS in the integrity bit position (bit 1) of each time slot before writing into the RAM buffer, and comparing this integrity bit with the known (PRS) sequence after each read would detect a read addressing fault. In the disclosed embodiment since the framing signal (bit 0) is also a PRS of length 256, the inversion of the frame signal is used for the integrity bit (bit 0) signal in each data word for simplicity and to avoid confusing the reframe circuits along the data path. This inverted frame signal, however, will be referred to as the PRS or pseudo-random sequence in the remainder of this specification.

Failures in the write addressing circuits cause time slots to be written in the wrong order to all or part of the RAM locations. Faulty write addressing over the entire memory space of the RAM will be detected by the PRS check described in the previous paragraph. If only part of the RAM is being written, the remainder of the RAM will contain correctly written data from previous frames. In the "write-active" subset of the RAM, correctly written data will share memory locations with incorrectly written data, each continuously overwriting the other. If a read to a location occurs before good data can overwrite bad data, an error will be detected by the PRS integrity check circuitry. If the read operation occurs before bad data overwrites good data, cross connects will not occur and no error will be detected by the PRS check. In this second case, data from previous frames will be passed during the time slots corresponding to the "write-inactive" RAM locations. Alternating a frame of the PRS check signal with a frame of a constant logic level (referred to as the on-line or DC check signal) in a reserved bit position of each time slot will detect this error.

Addressing failures by the RAM itself cause both reads and writes to access incorrect locations. Presented with the same address, however, both the read and write will access the same location. If the time slots out of the RAM are reordered, cross connects can occur and will be detected by the PRS check circuit. If not time slot reordering occurs, no cross connect exists and no error will be detected. This second case is acceptable.

Returning to FIG. 2, an integrity bit circuit 206 generates and inserts, on alternate data frames, the integrity bit (bit 1) in the bit 1 location of the intermodule data words received from TMS (180 of FIG. 1). A frame bit circuit 207 adds a framing bit as bit 0 and optical transmitter 208 transmits the signal over optical cable 125-1. Optical receiver 209 receives the signal and reframe circuit 210 reframes the data. On-line detect circuit 211 detects the presence of the on-line bit in the appropriate alternate frames of data. Parity circuit 212 checks the parity of the data in each time slot of a data frame. The time slot data words are written into and read out of data buffer 201 by addressing circuits (not shown) under control of local timing circuits. Time slot data, except for the integrity bit 1, are read from RAM buffer 201 and are loaded into source RAM 204 for communication to module 101-1. The integrity bit 1, is connected by loop circuit 213 to the output of destination RAM 205. The loop circuit can be merely a D-type flip-flop (not shown) which latches the integrity bit 1 from the output of buffer 201 and places it on the output of destination RAM 205.

Destination RAM 205 receives intermodule time slot data from port module 101-1 to which is added the integrity bit from loop circuit 213 and transmitted to RAM buffer 202. The addressing circuits (not shown) which control the writing into and reading from RAM buffer 202 operate under control of local timing circuits. The intermodule time slot data read from data buffer 202 has a framing bit added by frame circuit 214 and is transmitted over optical cable 125-1 by optical transmitter 215.

Optical receiver 216 receives the data which is reframed by reframe circuit 217 and stored in full frame data buffer 203. The full frame buffer (e.g., 203) of each MI (e.g., 127-1) is used for synchronizing the signals from each port module (e.g., 101-1) to TMS 180. Addressing circuits (not shown) control the writing into and reading from full frame buffer 203 under synchronous control of TMS timing circuits. After intermodule time slot data is read from data buffer 203 the integrity bit is checked for each time slot by integrity bit check circuit 220 and the parity is checked by parity circuit 219. This intermodule time slot data is transmitted to TMS (180 of FIG. 1). If the integrity bit for a time slot is incorrect when compared against the value inserted by integrity bit insert circuit 206, an error output signal is sent to system controller 100. System controller 100 then outputs diagnostic message to enable the system administrator to identify the circuit causing the addressing errors.

The frame bit circuit 207 and 214, reframe circuit 210 and 217, optical transmitter 208 and 215, optical receiver 209 and 216, RAM buffers 201, 202, 203, source RAM 204, destination RAM 205 and parity circuits 212 and 219 are standard circuits which operate in a well known manner in response to control signals (not shown) from the system controller or other units of the communication system and, hence, will not be further described herein. However, the operation of integrity bit circuit 206, on-line detect circuit 211 and integrity bit check circuit 220 are described in detail in the following paragraphs. In the following paragraphs the various standard system control signals, such as clocks and bit position signals which are used to operate the various circuits, are generated in a well known manner within the system and are not further described herein. In the following circuit descriptions, the signal or lead designations followed by an asterisk (*) indicate the inverse of that signal. Moreover, in the following description the FIG. location of a referenced signal, lead, or circuit can be determined from the first digit of the reference number (i.e., 206 is located in FIG. 2).

Figure 4:
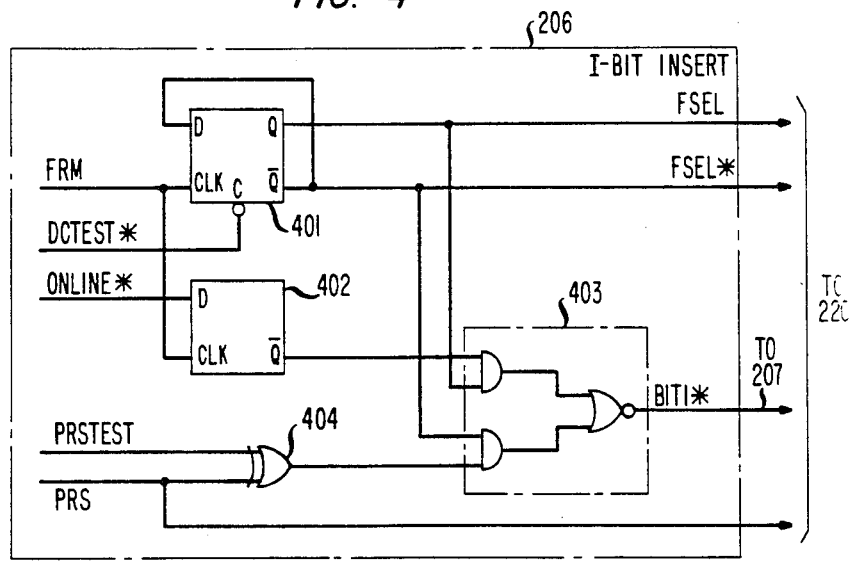
FIG. 4 shows a schematic diagram of the integrity bit transmitting circuit.

FIG. 4 illustrates an embodiment of integrity bit circuit 206 for generating and transmitting the integrity bit used for time slot integrity checking. The D-type flip-flop 401 is connected as a counter to divide the frame clock signal FRM by two to select either the latched on-line signal ONLINE* or the PRS bit PRS as bit one BIT1* for each time slot data word. As noted earlier, the disclosed embodiment uses the inverted frame sequence for integrity bit checking. The on-line signal ONLINE* is latched using D-type flip-flop 402. The output of flip-flop 402 connects to And-Or-Invert circuit 403 and is selected as signal BIT1* on alternate frames by the frame select output FSEL from flip-flop 401. The signal BIT1* is output to frame insert circuit 207 for transmission.

The on-line signal ONLINE*, from system controller 100, is also used as a DC check signal which indicates to TMS 180 data buffer addressing faults that are not causing cross connects. When signal DCTEST* is logic 0, flip-flop 401 is held in a cleared state and output FSEL is at logic 0 and output FSEL is at logic 1. This prevents the DC test signal ONLINE* from being output by gate 403 on alternate frames as the BIT1* signal.

The PRS signal PRS and a control signal PRSTEST are connected to Exclusive-Or circuit 404. When PRSTEST is a logic 1 the PRS signal is inverted and sent as the PRS check signal on alternating frames. The two test signals DCTEST* and PRSTEST are decoded from a control register (not shown) located on the module interface (127-1 of FIG. 1). The control register having the contents shown in FIG. 5 reports hardware detected fault conditions to the system controller 100, and provides control of the module interface (e.g., 127-1). Thus, for example, a misframe, an out of frame condition, or a parity error condition detected by the associated circuits shown in FIG. 2 would indicate that condition, respectively, in bits 4, 2 and 1 of the control register. Bit 0 is the buffer error bit of the control register which is generated by the error signal ERR* output of the integrity bit check circuit 220 shown in detail in FIG. 6.

Figure 5:
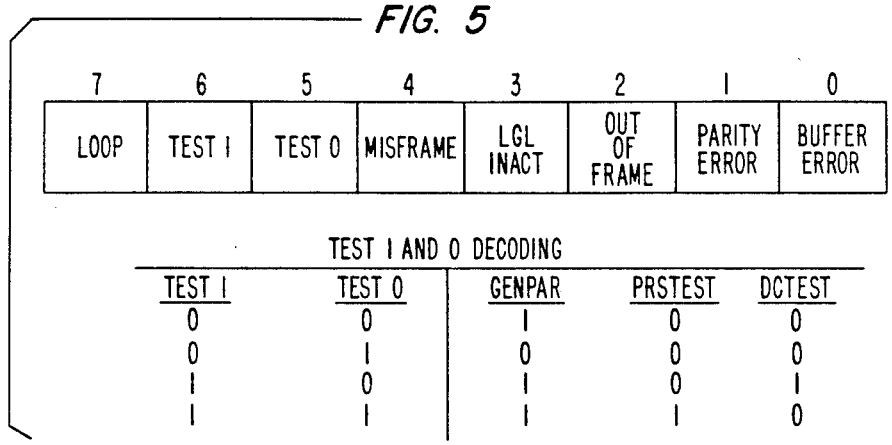
FIG. 5 shows a table describing the operating state of various control leads used by the present invention.

Bits 5 and 6 (TEST0 and TEST1) of the MISC register are generated by the software maintenance program and are decoded as shown in FIG. 5 to produce the test signals and functions such as generate parity GENPAR, pseudo-random sequence test PRSTEST, and DCTEST which are utilized by the various circuits of FIG. 1.

Figure 6:
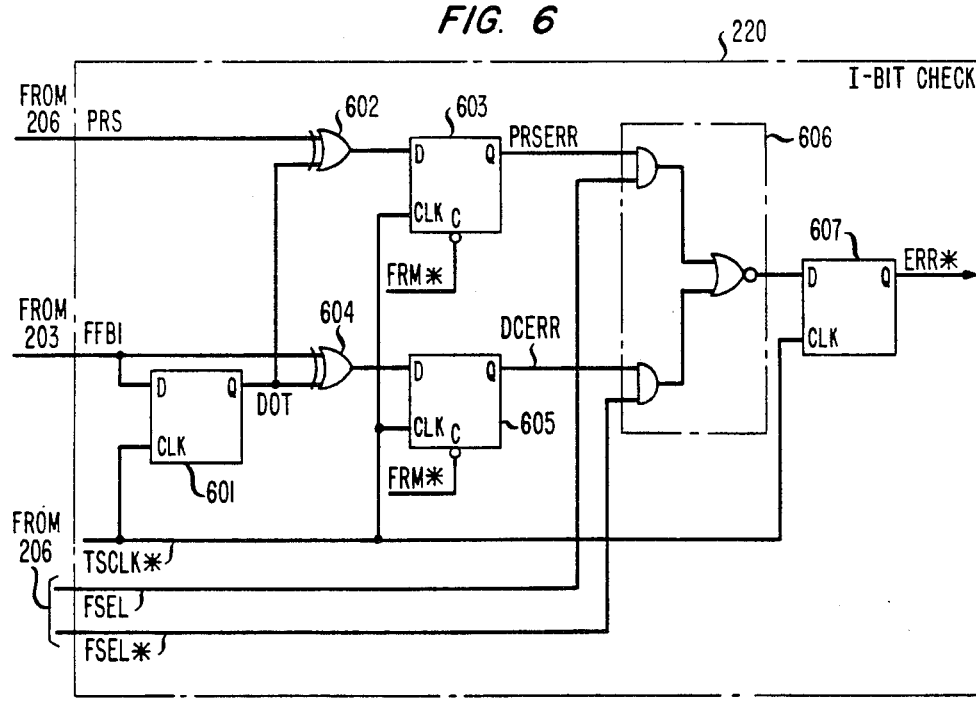
FIG. 6 shows a schematic diagram of the integrity bit comparing circuit.
Figure 7:
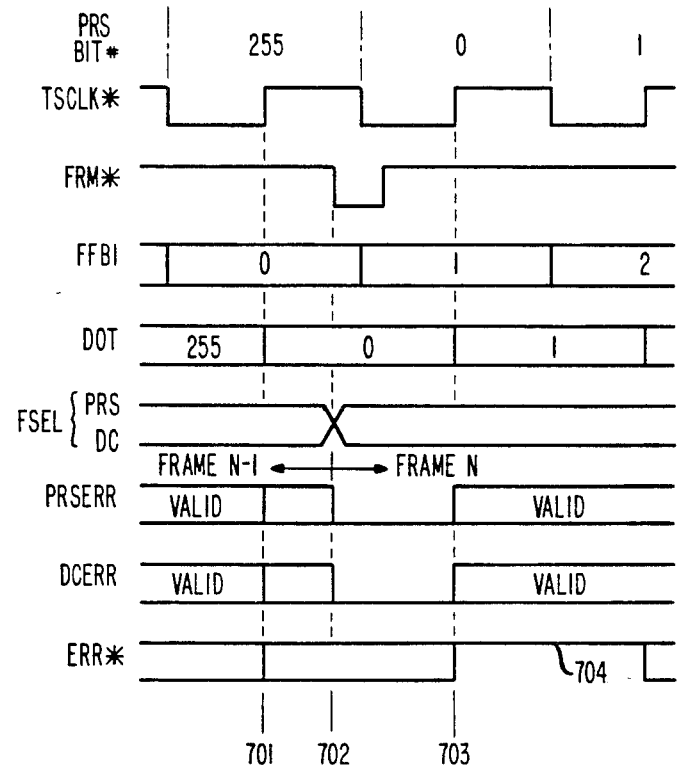
FIG. 7 shows a timing diagram useful in describing the operation of the present invention.

With joint reference to FIG. 6 and the timing diagram of FIG. 7, the integrity bit checking circuit 220 is described. The output of full frame buffer 203 is a 16 bit time slot word. Bit 1 of each time slot data word appears on lead FFB1. The signal is latched in the D-type flip-flop 601 on the rising edge of time slot clock (701) signal TSCLK*. Thus, flip-flop 601 delays the signal FFB1 one time slot. The Q output DOT of flip-flop 601 is compared with the signal PRS in Exclusive-Or gate 602. The signal PRS is the signal generated by integrity bit circuit 206. Thus, with reference to FIG. 7 at time 701 the integrity bit of time slot 255 on lead DOT is compared against bit 255 of the reference PRS generated by circuit 206. The output of gate 602 is latched in D-type flip-flop 603 on clock signal TSCLK* (at time 701).

The Q output of PRSERR flip-flop 603, indicating a PRS error, is logic 1 when a bit of the reference PRS (e.g., bit 255) is different from the integrity bit for the time slot (i.e., 255) outputted from full fame buffer 203. That is, if DOT is logic 1 while PRS is logic 0, or vice versa, then PRSERR flip-flop 603 is set indicating a time slot cross connect error. The signal FSEL switches between logic 0 and 1 on alternate frames and is used to select whether this particular frame is being used for integrity bit check (logic 1) or DC error check (logic 0). As shown in FIG. 7, the signal FSEL has a transition at a frame boundary at time 702. Thus, when FSEL is logic 1 gate circuit 606 gates the signal PRSERR to ERR flip-flop 607 which is clocked on signal TSCLK*. When PRSERR is logic 1 the error signal ERR is logic 1 (and ERR* is logic 0). System controller 100 receives the ERR* signal through control register bit 0.

Exclusive-Or gate 604 compares the previous full frame buffer bit 1 (FFB1) data on the Q output of delay flip-flop 601 with the FFB1 data for the current time slot to detect changing DC logic levels. A difference in logic level causes a logic 1 output from gate 604 which sets D-type flip-flop 605 on clock signal TSCLK*. The Q output of DCERR flip-flop 605, instead of signal PRSERR is selected by gate circuit 606 when FSEL* is logic 1 (i.e., FSEL=0). The output of gate circuit 606 is latched in ERR flip-flop 607 on clock signal TSCLK*.

The frame signal FRM* clears both the PRSERR flip-flop 603 and the DCERR flip-flop 605 at time 702. Both flip-flops are cleared to assure that whichever flip-flop is used on the next frame will start in a cleared state. As noted in circuit 206, this end-of-frame signal FRM alternately changes the state of the FSEL signal which controls whether the PRS check or the DC check is to be made by the integrity bit check circuit 220. Since the signal FRM* has cleared both flip-flops 603 and 605, during time 702, the ERR* flip-flop will be set on the next clock signal TSCLK* at time 703, at the beginning of the new data frame, indicating a no error condition 704 to the system controller 100.

Figure 8:
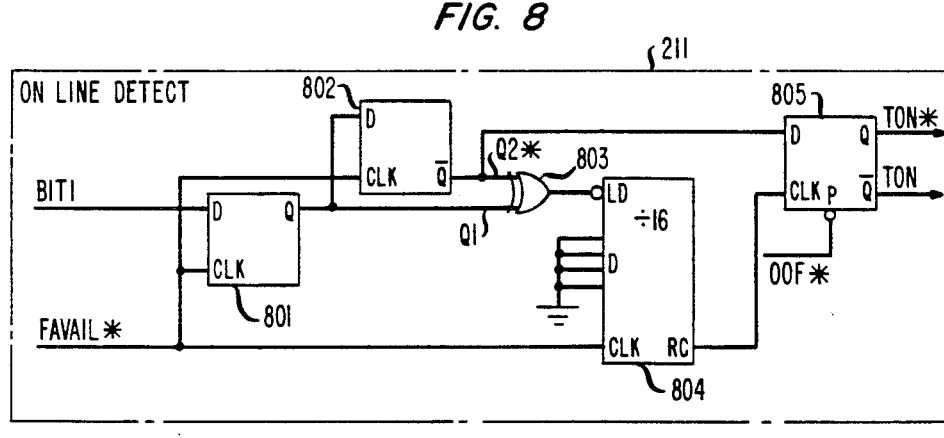
FIG. 8 shows a schematic diagram of the on-line control bit detect circuit.

With reference to FIG. 8, the on-line detect circuit (211 of FIG. 1) for the LGI (123-1 of FIG. 1) is described. The on-line detect circuit detects valid on-line information from the TMS 180. Bit 1 of each time frame (BIT1) is an output from reframe circuit 210. This signal is latched in D-type flip-flop 801 once every time slot on signal FAVAIL*. The Q1 output of flip-flop 801 is latched in D-type flip-flop 802 on signal FAVAIL*. The outputs Q1 and Q2* of flip-flops 801 and 802, respectively, are Exclusive-ORed in gate 803 and counted by a divide by 16 counter 804. Obviously a fixed number other than 16 can be implemented as counter 804. If outputs Q1 and Q2* (inverse of Q1) do not match for 16 consecutive time slots, no change has occurred in BIT1 and the output RC of counter 804 clocks Q2* into D-type flip-flop 805. Flip-flop 805 represents the new value of TON which is the TMS 180 on-line status. Flip-flop 805 is preset on OOF* when the time slot data stream if out-of-frame, forcing the signal TON to logic 0. TMS 180 is on-line when TON is a logic 1. Flip-flop 805 is preset on OOF* when the time slot data stream is out-of-frame, forcing the signal TON to logic 0.

The on-line status signal carried by bit 1 during alternating frames is detected by the on-line detect circuit 211 in LGI, 123-1. One method of detection is to determine (or know in advance) which frame type is currently being received from the MI, 127-1. This method requires additional signaling between the MI and LGI, and hence more cost. An alternative, based on the pseudo-random characteristics of the PRS check sequence, is more effective. The LGI on-line detect circuit 211 simply monitors the past history of bit 1, and when bit 1 has remained at a constant value (0 or 1) for more time slots than the longest run of 1s or 0s in the PRS, the current value of bit 1 is taken to be the on-line status signal. In the implementation described here, the longest run in the PRS is 9; when bit 1 is constant-valued for 16 or more time slots, the current value of bit 1 is latched as TMS on-line status. This method allows efficient detection of low-frequency signaling information transported in the same bit position during alternate frames as the PRS check signal (i.e., bit 1).

What has been disclosed is merely illustrative of the present invention. Other arrangements and methods can be implemented by those skilled in the art without departing from the spirit and scope of the present invention.

What is claimed is:

1. A time slot integrity circuit adapted for connection to a time mutiplexed communication system for checking the time slot ordering of data words in a data frame, said integrity circuit comprising
    means for transmitting over communication apparatus N first type data frames each including multiple data words followed by a second type data frame including multiple data words with each consecutive data word having a predetermined bit which is a consecutive bit of a pseudo random binary sequence, and
    means for checking said predetermined bit of each consecutive data word of said second type data frame received over said communication apparatus from said transmitting means against an associated consecutive bit of said pseudo random binary sequence and generating an error signal when any said predetermined bit of any of the received data words of said second type data frame differs from the associated consecutive bit of said pseudo random binary sequence.

2. The time slot integrity circuit of claim 1 including memory means for storing data words received from said transmitting means and for outputting said data words for transmission to said checking means.

3. The time slot integrity circuit of claim 2 wherein said transmitting means and said checking means are colocated, wherein any time delay between data words received from said memory outputting means and data words transmitted from said transmitting means is equal to an integral number of frames, and wherein said pseudo random binary sequence is derived from a common signal source.

4. The time slot integrity circuit of claim 1 wherein said transmitting means and said checking means are colocated in said circuit.

5. The time slot integrity circuit of claim 1 including
    means for selecting said predetermined bits from said data words received from said transmitting means and for transmitting said predetermined bits to said checking means.

6. The time slot integrity circuit of claim 1 where N is equal to 1.

7. The time slot integrity circuit of claim 1 wherein said checking means includes means for determining which received data word caused said error signal.

8. The time slot integrity circuit of claim 1 wherein said predetermined bit is a control bit of each consectutive data word in said first type data frame.

9. The time slot integrity circuit of claim 8 further including
    on-line detection means for detecting the contents of said predetermined bit of said first or said second type data frame and for determining a data frame where consecutive predetermined bits are at the same binary state for a fixed number of consecutive data words.

10. In a time multiplexed communication system, a method for checking the time slot ordering of data words, comprising the steps of:
    transmitting a first type data frame including multiple data words and transmitting a second type data frame after N of said first type data frames including multiple data words with each consecutive data word having a predetermined bit which is a consecutive bit of a pseudo random binary sequence, and
    checking said predetermined bits of consecutive data words of a received data frame against consecutive bits of said pseudo random binary sequence and generating an error signal when any of said predetermined bits of any of said received data words of said second type data frame differs from the associated consecutive bit of said pseudo random binary sequence.

11. The method of claim 10 including the step of:
    storing data words transmitted during said transmitting step and outputting said data words to said checking step.

12. The method of claim 10 including the step of:
    selecting said predetermined bits from said data words transmitted during said transmitting step and transmitting said predetermined bits to said checking step.

13. The method of claim 10 where said transmitting step alternately transmits said first and second type data frames.

14. The method of claim 10 wherein said checking step includes the step of determining which received data word caused said error signal.

* * * * *